US008545908B2

(12) United States Patent
Mulder et al.

(10) Patent No.: US 8,545,908 B2
(45) Date of Patent: Oct. 1, 2013

(54) METHOD OF PRODUCING YEAST FERMENTED BEVERAGES

(75) Inventors: Hendrikus Mulder, Uitgeest (NL); Onno Cornelis Snip, Rijswijk (NL); Herman Hendrik Jan Bloemen, Leiden (NL); Douglas John Banks, Auckland (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 558 days.

(21) Appl. No.: 12/301,447

(22) PCT Filed: May 14, 2007

(86) PCT No.: PCT/NL2007/050214
§ 371 (c)(1),
(2), (4) Date: Apr. 30, 2009

(87) PCT Pub. No.: WO2007/136253
PCT Pub. Date: Nov. 29, 2007

(65) Prior Publication Data
US 2009/0269438 A1    Oct. 29, 2009

(30) Foreign Application Priority Data

| May 19, 2006 | (EP) | ................................. | 06114246 |
| May 19, 2006 | (EP) | ................................. | 06114250 |
| May 19, 2006 | (EP) | ................................. | 06114256 |
| May 19, 2006 | (EP) | ................................. | 06114261 |
| May 19, 2006 | (EP) | ................................. | 06114275 |

(51) Int. Cl.
*C12C 11/00* (2006.01)
(52) U.S. Cl.
USPC .................... 426/16; 426/62; 426/64; 99/276
(58) Field of Classification Search
USPC .......................................................... 426/16
See application file for complete search history.

(56) References Cited

U.S. PATENT DOCUMENTS

| 3,234,026 A | 2/1966 | Coutts et al. |
| 4,915,959 A | 4/1990 | Pajunen et al. |
| 6,077,549 A | 6/2000 | Bodmer et al. |
| 2009/0311373 A1 | 12/2009 | Bank et al. |

FOREIGN PATENT DOCUMENTS

| CA | 545867 A | 9/1957 |
| DE | 33 14 958 A1 | 10/1986 |
| DE | 100 03 155 A1 | 8/2001 |
| DE | 44 30 905 C1 | 9/2001 |
| EP | 0 226 13 A2 | 1/1981 |
| EP | 0 460 66 B1 | 3/1984 |
| GB | 0 872 391 | 8/1961 |
| GB | 0 926 906 | 5/1963 |
| GB | 1163825 | * 10/1969 |
| GB | 1 300 116 | 12/1972 |
| GB | 2 197 341 A | 5/1988 |
| JP | 2005-151818 | 6/2005 |
| SU | 1283250 A1 | 1/1987 |
| WO | WO-98/49264 A1 | 11/1998 |
| WO | WO-01/68796 A2 | 9/2001 |
| WO | WO-2007/136251 A1 | 11/2007 |

OTHER PUBLICATIONS

International Search Report (PCT/NL2007/050214) dated Aug. 30, 2007.
Pollock, "Malt and Fermentation" International Food Information Service (IFIS), 1988, vol. 1, No. 1, p. 31. XP002403285.
Machine Translation of JP 2005-151818 (15 pages).
SU 1283250-A1 (English Abstract).

* cited by examiner

*Primary Examiner* — Elizabeth Gwartney
(74) *Attorney, Agent, or Firm* — Gilberto M. Villacorta; Sunit Talapatra; Foley & Lardner LLP

(57) ABSTRACT

The present invention relates to a method of producing yeast fermented beverages, which method comprises the following consecutive continuous processing steps:
a. introducing wort into a series of one or more propagation vessels in which it is combined with a recirculated stream of yeast-containing residue and in which the yeast is allowed to propagate under aerobic conditions while being kept suspended;
b. transferring the yeast-containing wort from the propagation vessel into a series of one or more fermentation vessels in which the yeast is kept suspended under anaerobic conditions and is allowed to metabolize carbohydrates present in the wort;
c. transferring at least a part of the fermented wort from the series of one or more fermentation vessels to one or more separators to remove a yeast-containing residue;
d. recirculating part of the yeast-containing residue to the series of one or more propagation vessels; and
e. feeding the remainder of the fermented wort to subsequent processing steps;
wherein the wet yeast content of the wort in the series of one or more fermentation vessels is maintained at more than 100 g/l.
The utilization of very high yeast concentrations offers the advantage that fermentation times and/or fermenter volume can be reduced substantially. Furthermore, continuous fermentations conducted at high yeast concentrations are less vulnerable to microbial infections.

12 Claims, No Drawings ns,908 B2

METHOD OF PRODUCING YEAST FERMENTED BEVERAGES

TECHNICAL FIELD OF THE INVENTION

The present invention relates to a method of producing yeast fermented beverages, such as beer, which method comprises continuous fermentation of wort by means of biologically active yeast.

BACKGROUND OF THE INVENTION

In the production of yeast fermented beverages, continuous fermentation offers a number of significant advantages, including:

- higher productivity and lower investment: equipment can be operated for prolonged periods of time under full load, meaning that for equal production volume smaller vessels are needed than in a batch process;
- constant and better quality: process is easier to control due to possibility of adapting process parameters to local and instantaneous requirements and because steady-state-conditions are much more stable;
- high hygienic standard: continuous process is operated in a closed system.
- less energy: energy consumption is evenly spread, without major use peaks; and
- less labour: operation of continuous process requires less attention
- less standstill and cleaning: continuous process can be operated at much longer runlengths than batch processes.

These potential advantages of continuous fermentation have been recognised by the brewing industry a long time ago. Accordingly, many attempts have been made to design continuous fermentation processes that do indeed deliver those potential benefits.

British patent GB-B 926 906 describes a process for the production of potable beer that can be operated continuously, which process comprises supplying a stream of unfermented wort to an enclosed vessel containing a vigorously agitated, substantially homogeneous, body of fermenting wort and yeast held at a substantially constant temperature, the rate at which the unfermented wort is added being arranged to displace fermented wort therefrom at a desired degree of attenuation of fermentable sugars, the displaced fermented wort being led from the enclosed vessel through an upwardly directed settling chamber, within which the flow rate of the fermented wort is sufficiently slow as to permit a substantial proportion of the yeast to separate out and fall back into the enclosed vessel. The process is said to offer the advantage that it permits a more compact apparatus to be used as no separate yeast separation stage is required. Furthermore, it is observed in the British patent that with different strains of yeast the amounts of yeast present in the apparatus varied between 35 and 100 gms/liter.

U.S. Pat. No. 3,234,026 describes a method for the continuous fermentation of brewery wort for the production of a potable, non-distilled alcoholic malt beverage product characterized by passing said wort through a system of interconnected zones, continuously introducing wort to the first zone of said system and promoting rapid fermentation thereof by maintaining a yeast concentration in said wort above 12 grams per liter, maintaining said wort at a temperature above 48° F., maintaining said yeast in suspension in said fermenting wort by continuous agitation whereby to promote such rapid fermentation, thereafter separating yeast therefrom and continuously drawing off the substantially clarified fermented wort from said system at the same rate as the rate of introduction of the wort to the first of said zones. It is observed in U.S. Pat. No. 3,234,026 that when insufficient yeast is being propagated to maintain desired concentration the invention contemplates re-using a portion of the separated yeast in the system for this purpose. Furthermore, the US patent describes embodiments of the aforementioned method in which yeast propagation and product formation occur in different zones or vessels. In claim 29 an embodiment is described wherein the yeast level in the product formation stage is maintained above 12 and up to 100 grams with a moisture content of 80% for each liter of fermenting wort (equivalent to a wet yeast content of 9-74 g/l).

CA 545,867 describes a method for the continuous fermentation of a yeast fermentable substrate, said method comprising maintaining separate yeast propagation and product formation stages, maintaining aerobic conditions, favourable to yeast propagation in the yeast propagation stage; maintaining anaerobic conditions favourable for alcohol production in the product formation stage; continuously introducing fermentable substrate to the yeast propagation stage, continuously passing effluent from the yeast propagation stage to the product formation stage; separating yeast from effluent of the product formation stage and re-introducing controlled amounts of the separated yeast to the product formation stage to maintain the yeast concentration therein at a controlled level. The Canadian patent application teaches to maintain the yeast concentration in the product formation stage at 5% to 15% pressed cake. In the typical operation that is described in the Canadian patent application the yeast concentration in the propagation is stage is about 1.2% pressed yeast and the yeast concentration in the product formation stage is maintained constant at 10% by recycling as much yeast as may be necessary to achieve this concentration.

SUMMARY OF THE INVENTION

The inventors have developed a method of producing yeast fermented beverages, which method comprises the following consecutive continuous processing steps:

a. introducing wort into a series of one or more propagation vessels in which it is combined with a recirculated stream of yeast-containing residue and in which the yeast is allowed to propagate under aerobic conditions whilst being kept suspended;
b. transferring the yeast-containing wort from the propagation vessel into a series of one or more fermentation vessels in which the yeast is kept suspended under anaerobic conditions and is allowed to metabolise carbohydrates present in the wort;
c. transferring the fermented wort from the series of one or more fermentation vessels to one or more separators to remove a yeast-containing residue;
d. recirculating part of the yeast-containing residue to the series of one or more propagation vessels; and
e. feeding the remainder of the fermented wort to subsequent processing steps;

wherein the wet yeast content of the wort in the series of one or more fermentation vessels is maintained at more than 100 g/l The inventors have discovered that the above mentioned continuous fermentation process can suitably be operated at extremely high yeast concentrations to produce a high quality beer. The utilisation of very high yeast concentrations offers the advantage that fermentation times and/or fermenter volume can be reduced substantially. Furthermore, continuous fermentations conducted at high yeast concentrations are less vulnerable to microbial infections. Because the fermentation times employed in the present process can be very short, it is feasible to instantly switch over to the production of another different yeast fermented beverage. Thus, the different products may be produced on same equipment, without intermediate cleaning or standstill.

DETAILED DESCRIPTION OF THE INVENTION

Accordingly, one aspect of the present invention relates to a method of producing yeast fermented beverages, which method comprises the following consecutive continuous processing steps:
a. introducing wort into a series of one or more propagation vessels in which it is combined with a recirculated stream of yeast-containing residue and in which the yeast is allowed to propagate under aerobic conditions whilst being kept suspended;
b. transferring the yeast-containing wort from the propagation vessel into a series of one or more fermentation vessels in which the yeast is kept suspended under anaerobic conditions and is allowed to metabolise carbohydrates present in the wort;
c. optionally recirculating a part of the yeast-containing fermented wort from the one or more fermentation vessels to the one or more propagation vessels;
d. transferring at least a part of the fermented wort from the series of one or more fermentation vessels to one or more separators to remove a yeast-containing residue;
e. recirculating part of the yeast-containing residue to the series of one or more propagation vessels; and
f. feeding the remainder of the fermented wort to subsequent processing steps;
wherein the wet yeast content of the wort in the series of one or more fermentation vessels is maintained at more than 100 g/l Whenever reference is made to "yeast content" or "yeast concentration", unless specifically indicated otherwise, what is meant is the concentration of wet yeast. The amount of wet yeast contained in a suspension equals the amount of yeast cake with a water content of 73% that may be isolated from the suspension by means of centrifugation. The aforementioned water content includes the water contained in the yeast cells.

The present process is particularly suitable for producing yeast-fermented malt beverages such as beer, ale, malt liquor, porter and shandy. Preferably, the present process is employed to produce an alcoholic or non-alcoholic beer.

According to a particularly preferred embodiment of the invention, the yeast concentration in the series of fermentation vessels is maintained at 120 g/l, more preferably at 150 g/l or more. Usually the yeast concentration in the fermentation vessels does not exceed 300 g/l, preferably it does not exceed 280 g/l, most preferably it does not exceed 250 g/l. In the series of propagation vessels the yeast concentration typically exceeds 20 g/l. Preferably the yeast concentration in the propagation vessel exceeds 50 g/l, more preferably it exceeds 70 g/l and most preferably it exceeds 90 g/l.

Following the combination of wort and yeast-containing residue, the yeast concentration may be reduced, e.g. by adding more wort, when the wort leaves the propagation vessel or during fermentation in the one or more fermentation vessels. Preferably, the yeast concentration is not reduced after propagation and also not before yeast separation.

The present process can be operated at high efficiency by recirculating a large fraction of the yeast-containing residue that is obtained from the one or more separators. According to a preferred embodiment, between 10 and 100%, most preferably between 50 and 100% of the yeast-containing residue that is removed from the fermented wort is recirculated to the one or more propagation vessels.

Typically, at least 20%, especially at least 40% of the yeast present in the fermented liquid is recirculated to the fermentation. Preferably at least 60% and most preferably at least 75% of the yeast present in the fermented wort is recirculated. Usually not more than 98% of the yeast present in the fermented wort is recirculated.

In order to achieve a high rate of yeast propagation it is important that the yeast is kept suspended. This may suitably be achieved by means of stirring, recirculation, carbon dioxide evolution and/or aeration. The productivity of the yeast in the series of one or more fermentation vessels is also optimal if the yeast is kept suspended. Preferably, the yeast is kept suspended in the series of one or more fermentation vessels by means of stirring, recirculation and/or carbon dioxide evolution. According to a particularly preferred embodiment, both the propagation and fermentation vessels employed in the present method are continuously stirred so as to keep the yeast suspended and to ensure the homogeneity of the suspensions within these vessels.

Since yeast propagation requires aerobic conditions, it is important that sufficient oxygen is made available to the yeast cells in the propagation vessel(s) to achieve sufficient propagation rates. Stirring and/or recirculation may suitably be employed to continuously introduce air or oxygen into the yeast-containing wort. In an advantageous embodiment of the invention, pressurised oxygen containing gas (e.g. air) is continuously introduced into the yeast-containing wort or into the headspace above the yeast-containing wort. Alternatively, said pressurised oxygen containing gas is injected into the wort stream or the recirculated stream of yeast containing residue prior to entry into the propagation vessel. In another alternative option, the oxygen containing gas is introduced directly into the yeast-containing wort, e.g. by means of injecting the gas through a plurality of injectors near the bottom of the propagation vessel(s). According to a particularly preferred embodiment, oxygen is supplied by introducing it into the wort stream prior to entry into the propagation vessel. This embodiment offers the advantage that the oxygen concentration can be controlled accurately. Oxygen is typically introduced in the yeast-containing wort in an amount of at least 8 ppm, preferably in an amount of 10-40 ppm, calculated on the main wort stream.

Due to the favourable propagation conditions employed in the propagation vessel(s), substantial amounts of yeast are produced in the present method. Typically, at least 5 gram, preferably at least 10 gram of wet yeast is produced per liter of fermented wort. Preferably, at least 0.05 g, more preferably at least 0.08 g and most preferably at least 0.1 g of wet yeast is produced per gram of fermented extract (15° P equals 150 g extract per kg). In order to maintain a high yeast concentration in the propagation vessel(s) the recirculated yeast-containing residue must have a high yeast content. Typically, the recirculated yeast-containing residue contains at least 150 g/l, preferably at least 200 g/l of wet yeast. More preferably, the recirculated residue contains at least 250 g/l, of wet yeast. According to a particularly preferred embodiment, the yeast content of the recirculated residue is at least 300 g/l even more preferably at least 400 g/l, most preferably at least 500 g/l. In case the fermentation is conducted at a high yeast concentration it is advantageous to recirculate a residue with a very high yeast content to the propagation/fermentation.

The temperature of the liquid within the series of one or more propagation vessels is suitably maintained within the range of 5-40° C., preferably within the range of 6-25° C., most preferably within the range of 6-18° C. The propagation vessel(s) may be operated under super-atmospheric pressure, especially if pressurised air or oxygen is introduced into the vessel. Preferably, the propagation vessel is operated at a pressure of 1-1.5 atmosphere.

In the present method both in the propagation and fermentation vessels the yeast is kept suspended. The present method preferably does not employ yeast that has been immobilised on a carrier.

The temperature of the fermenting wort within the fermentation vessel(s) is suitably maintained within the range of 5-40° C., preferably within the range of 6-25° C., more preferably in the range of 8-18° C. According to a particularly preferred embodiment, the present method employs at least two fermentation vessels. The use of two or more fermentation vessels offers the advantage that higher extract conversion rates can be achieved in the vessels preceding the last fermentation vessel. Typically, a sequence of not more than 4 fermentation vessels is employed. Most preferably, the present method employs a sequence of 2 or 3 fermentation vessels.

In a particularly advantageous embodiment of the present method the gravity of the wort that is introduced in the series of one or more propagation vessels is in the range of 10-35° P, more preferably in the range of 12-30° P and most preferably in the range of 12-20° P. By using a high gravity wort, i.e. a wort containing high levels of fermentable extract, maximum advantage may be gained from the high yeast concentrations employed in the present process. The combination of high gravity and high yeast concentration enables the production of fermented wort at an extremely high throughput relative to the size of the fermenters. Following fermentation, the fermented high gravity wort may be diluted, e.g. to produce a beer with an alcohol content of about 5 vol. %.

The present method offers the advantage that fermentation times can be reduced significantly compared to batch processes and continuous processes that utilise lower yeast concentrations. Typically, the combined residence time in the propagation and fermentation vessels does not exceed 40 hours, preferably it does not exceed 30 hours. According to a particularly preferred embodiment, the combined residence time in the propagation and fermentation vessels does not exceed 20 hours.

As explained herein before, because the fermentation times employed in the present process can be very short, it is feasible to instantly switch over to production of another different yeast fermented beverage by changing the composition of the wort and/or the processing conditions. Thus, according to a particularly preferred embodiment, the present method comprises the successive manufacture of two or more different beverages wherein switch-over between the manufacture of these beverages is achieved without interruption of the fermentation process.

The residence time in the series of one or more propagation vessels typically does not exceed 10 hours, preferably it does not exceed 5 hours. Usually, the residence time in the series of one or more propagation vessels exceeds 0.5 hours. The residence time in a vessel can be calculated by dividing the operational volume of the vessel by the wort flow rate to the process. The operational volume of the vessel equals the total volume of suspension that is contained in the vessel. In case a series of two or more are employed, the combined residence time in such a series of vessels can be calculated by adding up the residence times of the individual vessels.

In the present method propagation and fermentation are preferably executed in a closed system. The use of a closed system offers the advantage that it reduces the risk of infection and/or contamination. In addition, the use of a closed system makes it easy to collect the carbon dioxide that is generated by the yeast. The carbon dioxide collected from the propagation and/or fermentation vessels can be used, for instance, to carbonate the yeast fermented beverage. The latter application usually requires the carbon dioxide to be recuperated before it is added to the beverage.

In the present process, typically at least 20%, especially at least 40% of the yeast present in the fermented wort is removed from the fermented wort in the one or more separators. Preferably, at least 60%, more preferably at least 80%, even more preferably at least 90% and most preferably at least 95% of the yeast present in the fermented wort is removed.

Examples of separators that may be employed to remove the yeast-containing residue from the fermented wort include sedimenters, decanters, centrifuges, hydrocyclones, sieves, filters, membranes and presses. Preferably the separators employed for this purpose are selected from the group consisting of sedimenters, decanters and centrifuges. Most preferably, the separator employed in the present process is a sedimenter. Here the term "sedimenter" refers to an apparatus that uses gravity to separate suspended material from a liquid. The sedimenter typically contains an outlet for the separated yeast that is positioned near the bottom the sedimenter as well as an outlet for the supernatant low-yeast-containing liquid.

Typically, the present method employs a maturation step following wort fermentation. After fermentation, many undesirable flavours and aromas are present in the "green" or immature beer. Maturation (also sometimes referred to as ripening) reduces the levels of these undesirable compounds to produce a more palatable product.

Advantageously, maturation and yeast separation are achieved simultaneously in the present method in a continuous fashion by introducing the fermented wort containing at least 10 g/l of biologically active yeast into a sedimenter and separately removing the supernatant (i.e. low-yeast-containing fermentate) and yeast sediment from the vessel; wherein the residence time of the fermented wort in the vessel exceeds 6 hours, preferably exceeds 12 hours, more preferably exceeds 24 hours. According to a particularly preferred embodiment, the fermented wort passes through the sedimenter in a vertically downwards laminar flow. By combining yeast separation and maturation in one step important efficiency gains may be realised.

In the present method only part of the yeast-containing residue that is obtained from the one or more separators is recirculated. The other part, which still contains an appreciable level of fermented wort, is advantageously subjected to a washing step before being removed. Thus, the overall yield of the present method may be maximised.

Following the removal of the yeast-containing residue from the fermented wort the green beer so obtained can be subjected to further processing. In the case of production of beer, the further processing preferably includes clarification, carbonation and filling. Preferably, also this further processing is done in a continuous fashion.

The invention is further illustrated by means of the following example.

EXAMPLES

Example 1

This example describes the continuous fermentation of wort in a process that utilises one propagation vessel, two fermentation vessels, and one sedimenter.

Oxygenated wort with a specific gravity of 15° P is continuously supplied to the propagation vessel at a flow rate of 1.2 hl/hr. This wort is pitched by supplying a combined recirculation stream at a flow rate of 1.2 hl/hr to this propagation vessel. This combined recirculation stream consists of a stream of sedimented yeast at a flow rate of 1.1 hl/hr from the sedimenter and a stream of fermenting wort at a flow rate of 0.1 hl/hr from the first fermentation vessel. The propagation vessel contains a liquid volume of 1.1 hi, said liquid having a temperature of approximately 13° C. The yeast concentration in the propagation vessel is 98 g wet yeast/l. The liquid volume in the propagation vessel is kept constant by transferring the fermentation broth to a first fermentation vessel, which contains a liquid volume of 13.3 hl. The temperature in the first fermentation vessel is kept constant at 15° C. Due to yeast growth the yeast concentration in this vessel has increased to 103 g wet yeast/l.

The liquid volume in the first fermentation vessel is kept constant by transferring 2.3 hl/hr of the fermentation broth to the second fermentation vessel, which contains a liquid volume of 11.2 hi, and by recirculating 0.1 hl/hr of the broth back to the propagation vessel. The temperature in the second fermentation vessel is kept constant at 15.5° C. Due to yeast growth the yeast concentration in this vessel has increased to 107 g wet yeast/l. The apparent gravity in the second fermentation vessel is 2-3° P.

The liquid volume in the second fermentation vessel is kept constant by transferring the fermentation broth to the sedimenter. The sedimenter has a volume of 1 hi and conditions are such that yeast sedimentation is promoted. The sedimented yeast (containing approximately 200 g/l of wet yeast) is recirculated to the propagation vessel, and the fermentation broth with the reduced yeast content is continuously sent to a maturation vessel for further processing.

Example 2

Example 1 is repeated except that the liquid volume in the second fermentation vessel is kept constant by transferring the fermentation broth to the top of the maturation/sedimentation vessel. This cylindroconical vessel has a liquid volume of approximately 90 hl, a cone angle of 60° and a diameter of 2 m. A part of the sedimented yeast (1.1 hl/hr) is recirculated to the propagation vessel. The fermentation broth with the reduced yeast content is continuously sent to a beer storage vessel for further processing. The total diacetyl content (acetolactate plus diacetyl) in the supernatant liquid of the separation/maturation vessel and the total pentanedione content (acetobutyrate plus pentanedione) are reduced to acceptable levels.

The invention claimed is:

1. A method of producing a yeast fermented beverage, the method comprising the following consecutive continuous processing steps:
   a. introducing wort comprising carbohydrates and having a gravity in the range of 12 to 35°P into a series of one or more propagation vessels and combining the wort with a recirculated stream of yeast-containing residue to obtain a wet yeast concentration greater than 70 g/l, in which the one or more propagation vessels comprises yeast propagated under aerobic conditions while suspended, and in which the temperature of the liquid within the one or more propagation vessels is maintained within the range of 6-18° C.;
   b. transferring the yeast-containing wort from the propagation vessel into a series of one or more fermentation vessels and suspending the yeast under anaerobic conditions and metabolizing the carbohydrates present in the wort in the one or more fermentation vessels, in which the temperature of the fermenting wort within the one or more fermentation vessels is maintained in the range of 8-18° C.;
   c. optionally recirculating a part of the yeast-containing fermented wort from the one or more fermentation vessels to the one or more propagation vessels;
   d. transferring at least a part of the yeast-containing fermented wort from the series of one or more fermentation vessels to one or more separators to remove the yeast-containing residue;
   e. recirculating part of the yeast-containing residue to the series of one or more propagation vessels, the yeast-containing residue comprising at least 150 g/l of wet yeast; and
   f. feeding the remainder of the fermented wort to subsequent processing steps;
   wherein the wet yeast content of the wort in the series of one or more fermentation vessels is maintained at 100 g/l or more,
   wherein pressurised oxygen-containing gas is continuously introduced into the propagation vessel, into the wort comprising carbohydrates or into the recirculated stream of yeast-containing residue, so as to introduce at least 8 ppm of oxygen, calculated on the wort comprising carbohydrates,
   and wherein 60-98% of the yeast present in the fermented wort is recirculated to the one or more propagation vessels.

2. The method according to claim 1, wherein the wet yeast content of the wort in the series of one or more fermentation vessels is maintained at between 100 and 300 g/l.

3. The method according to claim 1, wherein at least 75% of the yeast present in the fermented wort is recirculated to the series of one or more propagation vessels.

4. The method according to claim 1, wherein the yeast is kept suspended in the series of one or more propagation vessels by means of stirring, recirculation, carbon dioxide evolution and/or aeration.

5. The method according to claim 1, wherein the yeast is kept suspended in the series of one or more fermentation vessels by means of stirring, recirculation and/or carbon dioxide evolution.

6. The method according to claim 1, wherein at least 10 g of wet yeast is produced per liter of fermented wort.

7. The method according to claim 1, wherein the recirculated yeast-containing residue contains at least 200 g/l of wet yeast.

8. The method according to claim 7, wherein the recirculated yeast-containing residue contains at least 250 g/l of wet yeast.

9. The method according to claim 1, wherein the combined residence time in the propagation and fermentation vessels does not exceed 40 hours.

10. The method according to claim 9, wherein the combined residence time in the propagation and fermentation vessels does not exceed 20 hours.

11. The method according to claim 1, wherein the residence time in the series of one or more propagation vessels does not exceed 10 hours.

12. The method according to claim 11, wherein the residence time in the series of one or more propagation vessels does not exceed 5 hours.

* * * * *